(12) United States Patent  (10) Patent No.: US 6,209,671 B1
Klein et al.  (45) Date of Patent: Apr. 3, 2001

(54) TOWING APPARATUS (76) Inventors: John J. Klein, 11311 Terrebone Dr., Cypress, TX (US) 77429; Alan J. Feltis, 11719 Bexhill Dr., Houston, TX (US) 77065

(*) Notice: Subject to any disclaimer, the term of this patent is extended or adjusted under 35 U.S.C. 154(b) by 0 days.

(21) Appl. No.: 09/549,298

(22) Filed: Apr. 14, 2000

Related U.S. Application Data (62) Division of application No. 08/865,202, filed on May 29, 1997, now Pat. No. 6,112,838.

(51) Int. Cl.[7] .................................................. B62D 51/04
(52) U.S. Cl. ........................................ 180/19.3; 180/904
(58) Field of Search ............................. 180/904, 12, 13, 180/19.1–19.3, 253; 280/89

(56) References Cited

U.S. PATENT DOCUMENTS

| | | | |
|---|---|---|---|
| 2,228,247 | 1/1941 | Cunningham | 280/89 |
| 2,732,088 | 1/1956 | Arnot | 214/332 |
| 2,734,716 | 2/1956 | Pearne | 254/1 |
| 2,846,018 | 8/1958 | Puckett | 180/6.2 |
| 2,874,861 | 2/1959 | Arnot | 214/332 |
| 2,877,911 | 3/1959 | Arnot | 214/332 |
| 2,877,913 | 3/1959 | Arnot | 180/904 |
| 2,919,043 | 12/1959 | Sharp | 180/904 |
| 3,038,550 | 6/1962 | Lehmann et al. | 180/14 |
| 3,049,253 | 8/1962 | Cabral | 214/147 |
| 3,196,971 | 7/1965 | Schantz | 180/19.2 |
| 3,439,764 | 4/1969 | Kimball | 180/12 |
| 3,624,811 | 11/1971 | Brackett | 180/904 |
| 3,662,911 | 5/1972 | Harman | 214/334 |
| 3,819,001 | 6/1974 | Pavelka | 180/19 |
| 3,861,483 | 1/1975 | Pavelka | 180/19 |
| 4,057,158 | 11/1977 | Lissy | 180/904 |
| 4,192,626 | 3/1980 | Wyckoff et al. | 180/19.2 |
| 4,210,217 | 7/1980 | Lachowicz | 180/13 |
| 4,318,448 | 3/1982 | Cline | 180/14 |
| 4,576,245 | 3/1986 | Oldani | 180/14.1 |
| 4,950,121 | * 8/1990 | Meyer et al. | 180/904 |
| 4,955,777 | 9/1990 | Ineson | 180/904 |
| 5,129,667 | 7/1992 | Gratton | 280/493 |
| 5,511,926 | * 4/1996 | Iles | 180/904 |
| 6,112,838 | * 9/2000 | Klein et al. | 180/904 |

* cited by examiner

*Primary Examiner*—Brian L. Johnson
*Assistant Examiner*—Matthew Luby
(74) *Attorney, Agent, or Firm*—Fulbright & Jaworski L.L.P.

(57) ABSTRACT

A towing apparatus capable of moving aircraft and other workpieces about an airfield or other workspace. The present invention includes a first frame which is rotatable relative to a second frame about a common substantially vertical axis. A wheel assembly is positioned within the first frame and driven by a motor which is also mounted on the first frame. A gripper assembly for engaging the aircraft or other workpiece is attached to the second frame. In this manner, the present invention provides for the towing of aircraft or other workpieces along an axis which is proximate the axis of the wheel assembly. Additionally, it provides for a low center of gravity significantly enhancing the stability and maneuverability of the present invention in a towing attitude or a non-towing attitude.

22 Claims, 6 Drawing Sheets

TOWING APPARATUS

CROSS REFERENCE TO RELATED APPLICATIONS

This application is a divisional of application Ser. No. 08/865,202, now U.S. Pat. No. 6,112,838, filed May 29, 1997, and hereby incorporated by reference for all purposes.

BACKGROUND OF THE INVENTION

1. Field of the Invention

The present invention relates to an apparatus for towing a workpiece. More particularly, the present invention relates to a motorized tractor-towing apparatus of enhanced stability capable of towing an airplane, trailer, or other workpiece.

2. Description of the Related Art

It is frequently necessary to move closely-parked private aircraft, for example, around an airfield or within a hanger. State of the art devices disclose tractors having some capability of moving such aircraft but are unstable, particularly when pulling a heavy workpiece, such as an aircraft. See, for example, U.S. Pat. Nos. 3,819,001 and 3,861,483. Because of their unstable nature, such prior art devices require a stabilizer bar or other mechanism to stabilize it and make it more maneuverable particularly in a towing attitude. However, such additional structure makes the prior art devices particularly difficult to operate in congested conditions such as those frequently found at private airfields.

Other prior art aircraft handling and towing devices are cumbersome and do not provide for sharp turning radii required in maneuvering aircraft about a congested airfield, for example. See U.S. Pat. Nos. 3,049,253; 2,732,088; 2,734,716; 3,038,550; 3,662,911; 4,318,448; and 4,576,245.

Additionally, there exists the need for an enhanced gripper mechanism to attach to the nosewheel or tailwheel of an aircraft in a secure manner and yet operate with a small turning radius. Prior art disclosures, such as U.S. Pat. Nos. 2,874,861 and 2,877,911, do not permit the type of gripping necessary for a tight turning radius operation with enhanced locking capability.

Accordingly, the need exists for an improved towing apparatus for aircraft and other workpieces which is stable even when not towing a workpiece. However, once engaged to either a nosewheel or a tailwheel of an aircraft for example, the device provides for a tight turning radius and is easy to maneuver in forward or reverse.

SUMMARY OF THE INVENTION

The present invention is an apparatus for towing a workpiece, such as an aircraft. The apparatus comprises first and second frames which are in spaced vertical relationship to one another. The frames are attached in such a manner that the first frame rotates relative to the second frame about a common substantially vertical axis. A wheel assembly is supported by the first frame and includes a wheel for rotational movement about a first axis. A motor is used to power the wheel assembly. A handle assembly is attached to the first frame to enable the operator to rotate the first frame relative to the second frame. A gripper assembly is supported by the second frame and offset from the vertical axis. The gripper assembly is positioned on the second frame to engage a workpiece for towing along a second axis which is positioned above or below the first axis by no more than about 30% of the radius of the wheel. In this manner, the present invention provides a low center of gravity and permits the towing axis, or the working axis, to be at or near the rotating axis of the wheel. Thus, a stable towing apparatus is provided which permits the workpiece, such as the nosewheel or tailwheel of an aircraft, to be in close proximity to the wheel of the present invention. Consequently, the turning radius is small.

The present invention may also include a transmission, such as a hydrostatic transmission, positioned between the motor and the wheel assembly to enable the transmission of power from the motor to the wheel on a smooth basis and permit motorized forward and rearward motion of the towing apparatus and the workpiece.

The gripper assembly of the present invention may be used to tow the nosewheel of an aircraft or another wheel of a workpiece. Alternatively, the gripper assembly may be used to tow the tailwheel of an aircraft. If the nosewheel of an aircraft is being pulled, it may be preferable to permit the nosewheel to remain in contact with the ground while the present invention tows the aircraft. In this event, the gripper assembly is supported by the second frame and includes a stationary arm and a pivotal arm. The pivotal arm is rotated relative to the second frame. Once engaged the ends of both the first and second arms compress the axis of a nosewheel to permit a pulling or pushing towing operation by the present invention. The gripper assembly may also include a gas cylinder, for example, positioned between the first and second arms to dampen any movement between the ends of either arm and the nosewheel thereby further securing the first arm relative to the second arm.

In the event the present invention is intended to engage the tailwheel of an aircraft, the gripper assembly may include a tow frame supporting a cradle. The gripper assembly may include means to tilt one end of the tow frame toward the ground enabling the cradle to engage and support the tailwheel. The gripper assembly may also include means for activating the tilt means to lower one end of the tow frame and then raise that same end thereby elevating the tailwheel off the ground and permitting the present invention to tow the aircraft along a towing axis positioned between about 60% of the radius of the wheel of the present invention above the axis of that wheel to about 60% of the radius of that wheel below the rotational axis of the wheel.

Thus, the present invention provides a stable pushing and pulling towing apparatus for a workpiece such as an aircraft that provides for a sharp turning radius, forward and rear motion, and the introduction of substantial power in a forward or rearward direction on a smooth and continuous basis.

The more important features of this invention have been summarized rather broadly in order that the detailed description may be better understood. There are, of course, additional features of the present invention which will be described hereinafter and which will also form the subject of the claims appended hereto.

BRIEF DESCRIPTION OF THE DRAWINGS

In order to more fully describe the drawings used in the detailed description of the present invention, a brief description of each drawing is provided.

DETAILED DESCRIPTION OF THE PREFERRED EMBODIMENT

Referring to FIGS. 1–4, the present invention is a towing apparatus 20 having a first frame 22 and a second frame 24. Each frame 22 and 24 is generally rectangular in configuration. In the case of frame 22, it is shown to include longitudinal members 26 and transverse members 28. Second frame 24 includes longitudinal members 30 and a transverse member 32. The present invention also includes a handle assembly 38 having a member 39 which is attached to first frame 22 at pin connection 40. Member 42 serves to brace member 39 to first frame 22.

Referring still to FIGS. 1–4, a motor 44 is attached to, and supported by, first frame 22. Motor 44 may be a conventional internal combustion motor such as a lawnmower motor. In the prototype of the present invention, the motor is a 3.5 horsepower Briggs & Stratton engine, readily commercially available. Alternatively, motor 44 may be another type of motor such as an electric motor or an air motor. Obviously, in such cases the user would need to provide a power source such as electricity or compressed air through a power cord or air hose up to motor 44. In the case of an internal combustion engine as shown, a throttle 46/cable 48 is attached to handle 38 and connects with the throttle setting of motor 44 to power up or down motor 44. The throttle 46/cable 48 assembly is well known to those skilled in the art and is similar to that found on commercially-available lawnmowers.

Figures 3, 4:
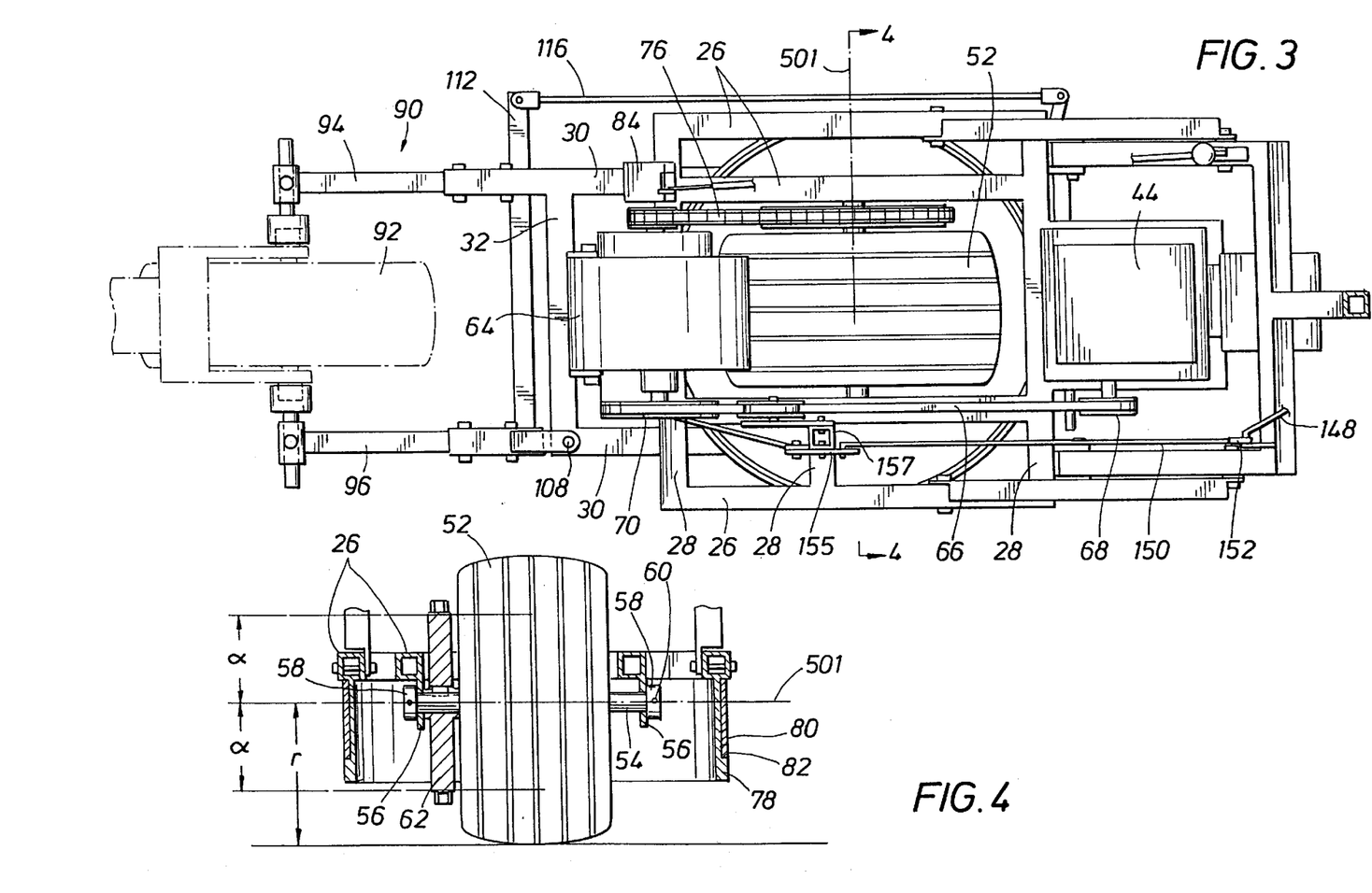
FIG. 3 is a cross-sectional view of the present invention taken along line 3—3 of FIG. 1.
FIG. 4 is a detailed cross-sectional view taken along line 4—4 of FIG. 3.

The present invention also includes a wheel assembly 50 which is rotatably supported within first frame 22. Referring to FIGS. 3 and 4, wheel assembly 50 includes a wheel/tire 52. Axle 54 passes through wheel 52 and is rotatably supported in the preferred embodiment by flanges 56 which are attached to longitudinal members 26 of first frame 22. Each end of axle 54 is held in place by a hub 58 having a lynch pin 60 or other fastener such as a set screw. A sprocket 62 is attached to axle 54 and fixed relative to axle 54 and wheel 52. In this manner, wheel 52 rotates about axle 54, but within first frame 22.

Referring back to FIGS. 1–2, the present invention may include a transmission 64, preferably a hydrostatic transmission, such as that manufactured by the Eaton Corporation, model no. C-250-801. Such a hydrostatic transmission is well known to those skilled in the art and is commonly used on riding lawnmowers, garden tractors and off-road vehicles. Such a transmission serves to provide a gradual increase and decrease in power from motor 44 and transfer that power to a wheel assembly 50 in accordance with the present invention as described below. In addition, such a transmission provides for motorized forward and rearward motion.

Figure 1:
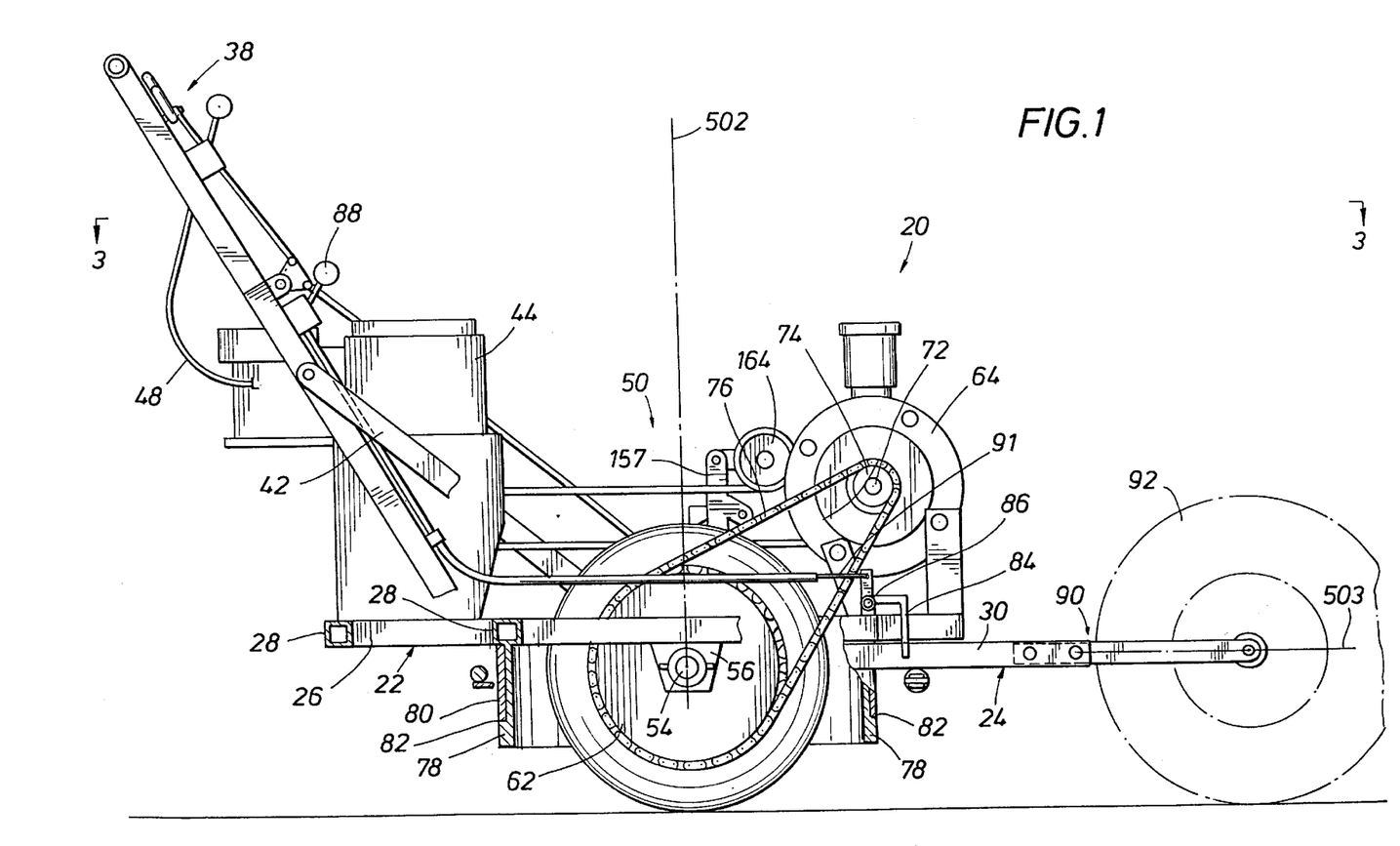
FIG. 1 is an elevation view of the present invention.
Figures 2, 11:
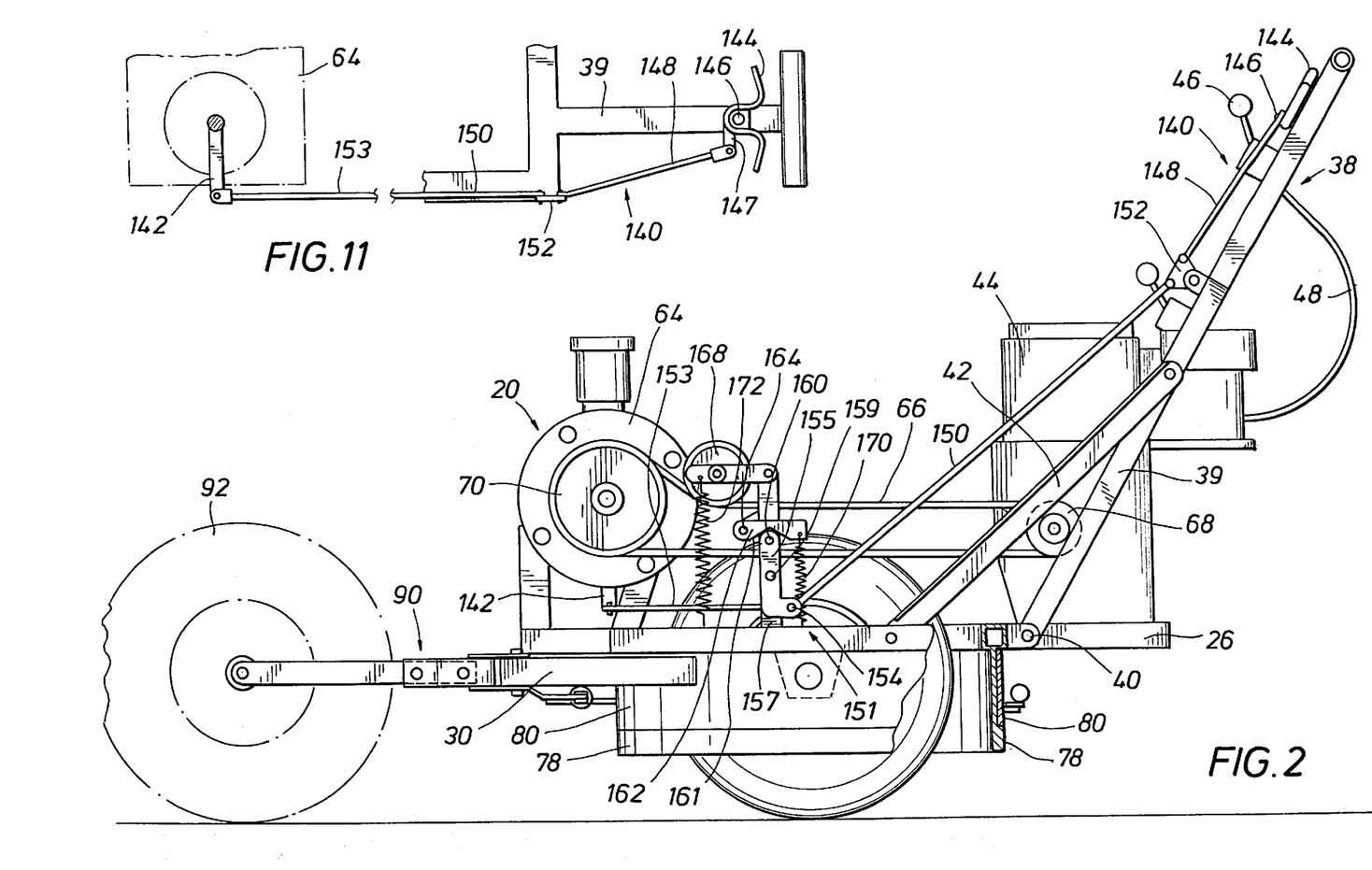
FIG. 2 is an elevation view of the present invention from the opposite side shown in FIG. 1.
FIG. 11 is a partial top view of a portion of the present invention.

Power is transferred from motor 44 to transmission 64 by means of a belt 66. As shown in FIG. 2, belt 66 passes around drive pulley 68 of motor 44 and pulley 70 of transmission 64. In accordance with the operation of the present invention as will be described in more detail below, the power output side of transmission 64 is shown in FIG. 1 as drive shaft 72. Shaft 72 is connected to a sprocket 74. A chain 76 is used to drivably engage sprocket 74 with sprocket 62 thereby rotating wheel 52 and driving the present invention.

Referring still to FIGS. 1–4, but in particular FIGS. 1 and 4, second frame 24 is rotatably supported relative to first frame 22 by concentric drums 78 and 80. As shown in FIG. 2 and as noted above, second frame 24 comprises longitudinal members 30. Each longitudinal member 30 is fixedly attached to outer drum 80. Outer drum 80 is a cylindrical member which is vertically supported by, and rotates within, inner drum 78. Drum 78 is securely attached to members 26 of first frame 22. Referring still to FIGS. 1 and 4, it can be seen that outer drum 80 is supported vertically by shoulder 82 of inner drum 78. Thus, second frame 24 can rotate relative to first frame 22 since outer drum 80 can rotate about inner drum 78 about a full 360°. If desirable, second frame 24 may be locked to first frame 22 by a bracket 84 which is pivotably attached at connection 86 to first frame 22. When it is desirable to permit the rotation of the first frame 22 relative to the second frame 24, in accordance with the operation of the present invention as described below, the operator pulls knob 88 upwardly displacing cable 91 and thereby pivoting bracket 84 about connection 86. Thus, bracket 84 releases first frame 22 relative to second frame 24 enabling the rotational movement of first frame 22 relative to second frame 24.

Figure 5:
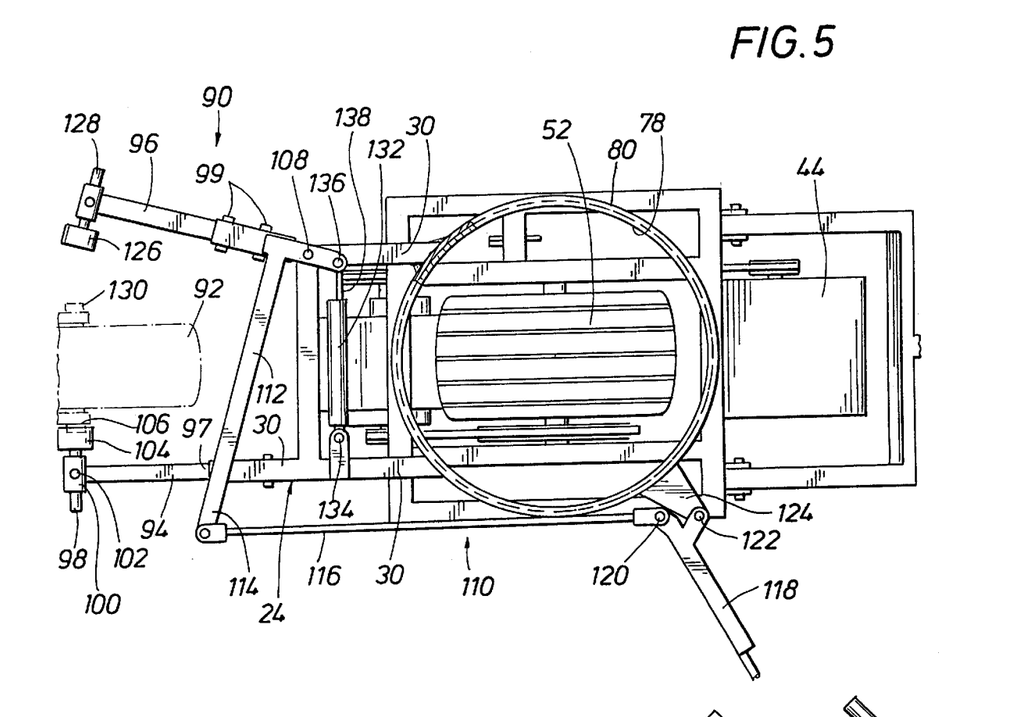
FIG. 5 is a bottom view of a portion of the present invention.
Figure 6:
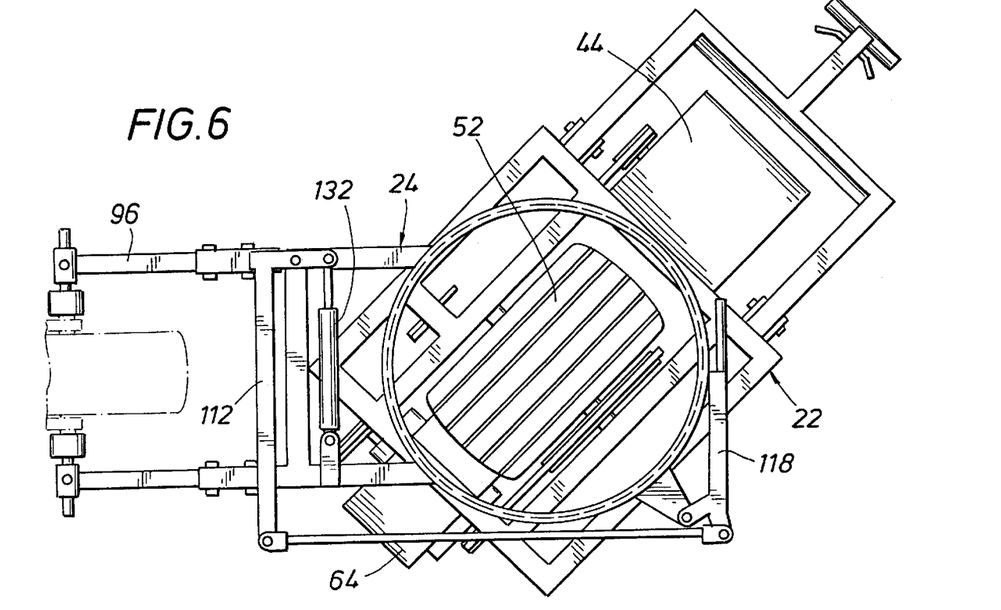
FIG. 6 is a view similar to FIG. 5 but in a different operational sequence from that shown in FIG. 5.

Referring still to FIGS. 1 and 2 and now FIGS. 5 and 6, the present invention also includes a gripper assembly 90 which is used to engage a workpiece. In the case of FIGS. 1–6, the workpiece as shown in phantom lines is a wheel 92, such as the nosewheel of an aircraft. Obviously, it will be apparent to one skilled in the art that wheel 92 may be the wheel of a workpiece other than an aircraft. Gripper assembly 90 comprises a first arm 94 and second arm 96. Referring to FIG. 5 (which is a bottom view looking upwardly), first arm 94 is fixedly attached to second frame 24. First arm 94 includes a longitudinal member 97 which is shown bolted to longitudinal member 30 of second frame 24. A sleeve 100 is attached at one end to member 97 and a pin 98 is adapted to pass through sleeve 100. Pin 98 is bolted by screw 102 to sleeve 100. A hub 104 is attached at one end of pin 98. Hub 104 includes a recess and is selected in size to pass over the axle or wheel hub 106 of nosewheel 92.

Referring still to FIG. 5, second arm 96 of gripper assembly 90 is pivotably connected to frame 24 at pin connection 108. The second arm 96 also includes a hub 126/pin 128 arrangement similar to that described earlier with respect to hub 104/pin 98 of first arm 94. Again, hub 126 engages wheel hub 130 of nosewheel 92. A linkage assembly 110 supported by second frame 24 is used to pivotably rotate second arm 96 relative to second frame 24. Linkage assembly 110 includes a lever arm 112 attached at one end to pin connection 108 and at its other end 114 to rod 116. Rod 116 is in turn pivotably connected to handle 118 at connection 120. Handle 118 is pivotably connected and supported by bracket 124 at pin connection 122. Bracket 124 is welded directly to drum 80 as are longitudinal members 30 of second frame 24. The selection of the length of bracket 124 from drum 80 to pin connection 122 is such that when handle 118 is rotated about pin connection 122 to the closed position as shown in FIG. 6, an over-the-center locking action occurs which prevents handle 118 from being prematurely released except by the operator physically moving handle 118 back to the position shown in FIG. 5. This results in the locking of nosewheel 92 relative to said second frame 24. The gripper assembly 90 may also include a dual-acting gas cylinder 132 which serves to provide compressive resistance in either direction. It is attached at one end 134 to second frame 24 and at its other end 136 to lever arm 112. When handle 118 is rotated to the position shown in FIG. 6 enabling the engagement of second arm 96 against hub 130 of wheel 92, shaft 138 of gas cylinder 132 is extended thereby resisting any movement of second arm 96 relative to second frame 24 as may be caused by any jarring or bouncing movement of nosewheel 92. Yet cylinder 132 serves to permit extreme movement of the end of second arm 96 at hub 126 which may occur if nosewheel 92 hits a pothole or other obstruction on the airfield while being towed. This permits the emergency release of the nosewheel 92 without damaging the nosewheel axle or nosewheel undercarriage assembly.

Referring back to FIG. 2, as discussed above transmission 64 receives its input power from belt 66. Transmission 64 provides forward or rearward direction of the present invention by placement of lever 142 in a forward or rearward direction as discussed herein. This is the mechanism most commercially available hydrostatic transmissions use to shift the direction of rotation of its drive shaft. The Eaton model employed in the prototype of the present invention provides for forward or rearward motion by shifting the rotation of drive shaft 72 from a clockwise revolution to a counterclockwise revolution, depending on the orientation of lever 142.

Referring to FIGS. 2 and 11, handle linkage assembly 140 includes a handle 144 which enables the operator to pull up on either side of handle 144 activating the forward and rearward direction of the present invention in accordance with the foregoing description. Handle 144 is pivotably bolted at connection 146 to member 39 and to a transverse member 147. Member 147 is pivotally connected to link 148. Link 148 is in turn connected to a link 150 through a triangular plate 152. Link 150 is pivotably connected to rod 153, and rod 153 connects to lever 142.

Referring to FIG. 2, the present invention also includes a mechanism to return handle 144 to a centered position as shown in FIGS. 2 and 11. That mechanism is shown in FIG. 2 as centralizer system 151. Link 150 is also pivotally attached at connection 154 to member 155. Member 155 is pivotally connected to a vertical member 157 (FIG. 3) at pin connection 159. Vertical member 157 is fixed to first frame 22. In this manner, member 155 pivots about connection 159 as handle 144 is pulled. Centralizing system 151 also includes a camming member 162 which is fixedly attached at connection 164 to vertical member 157. Camming member 160 pivots at connection 164 and is restrained at its other end by spring 170. In this manner, when either end of handle 144 is pulled and released, the notched portion 161 of camming member 162 serves to return member 155 to the vertical position as shown in FIG. 2. This then serves to return link 150 to its neutral position and also handle 144 to the neutral position as shown in FIG. 11.

In addition to the centralizer system 151 shown in FIG. 2, a tensioner system 163 is also shown in FIG. 2 which serves to ensure adequate tension is maintained on belt 66. This is achieved through a pulley 168 which is supported by member 166. Member 166 is in turn pivotally connected to vertical member 157, and the other end of member 166 is forced in a downward position by compression spring 172. Pulley 168 is urged against the top of belt 66 to ensure that belt 66 remains tight against both pulleys 68 and 70.

The operation of transmission 64 to drive the present invention is as follows. When the operator pulls up or squeezes the right hand portion of handle 144 as shown in FIG. 11, links 148 and 150 are advanced forwardly. This in turn advances rod 153 and lever 142 forward. Advancement of lever 142 forward causes the rotation of drive shaft 72 (see FIG. 1) of the Eaton transmission selected to rotate in a clockwise direction. This in turn causes the clockwise rotation of sprocket 62 which advances the present invention forward. Similarly, when the operator pulls up on the left hand portion of handle 144 as shown in FIG. 11, links 148 and 150 and rod 153 are advanced rearwardly which in turn causes lever 142 to move to the right as shown in FIG. 2. This causes the Eaton transmission to rotate drive shaft 72 in a counterclockwise direction providing for rearward motion of the present invention. Thus, whether the operator is pulling up on the left or right hand portion of handle 144 will determine whether the present invention moves in a forward or rearward direction. If the operator is not pulling up on either portion of handle 144, the lever 142 remains in a neutral position as shown in FIG. 2 due to the centralized system 151 and sprocket 74 of transmission 64 does not rotate.

Figures 7, 8:
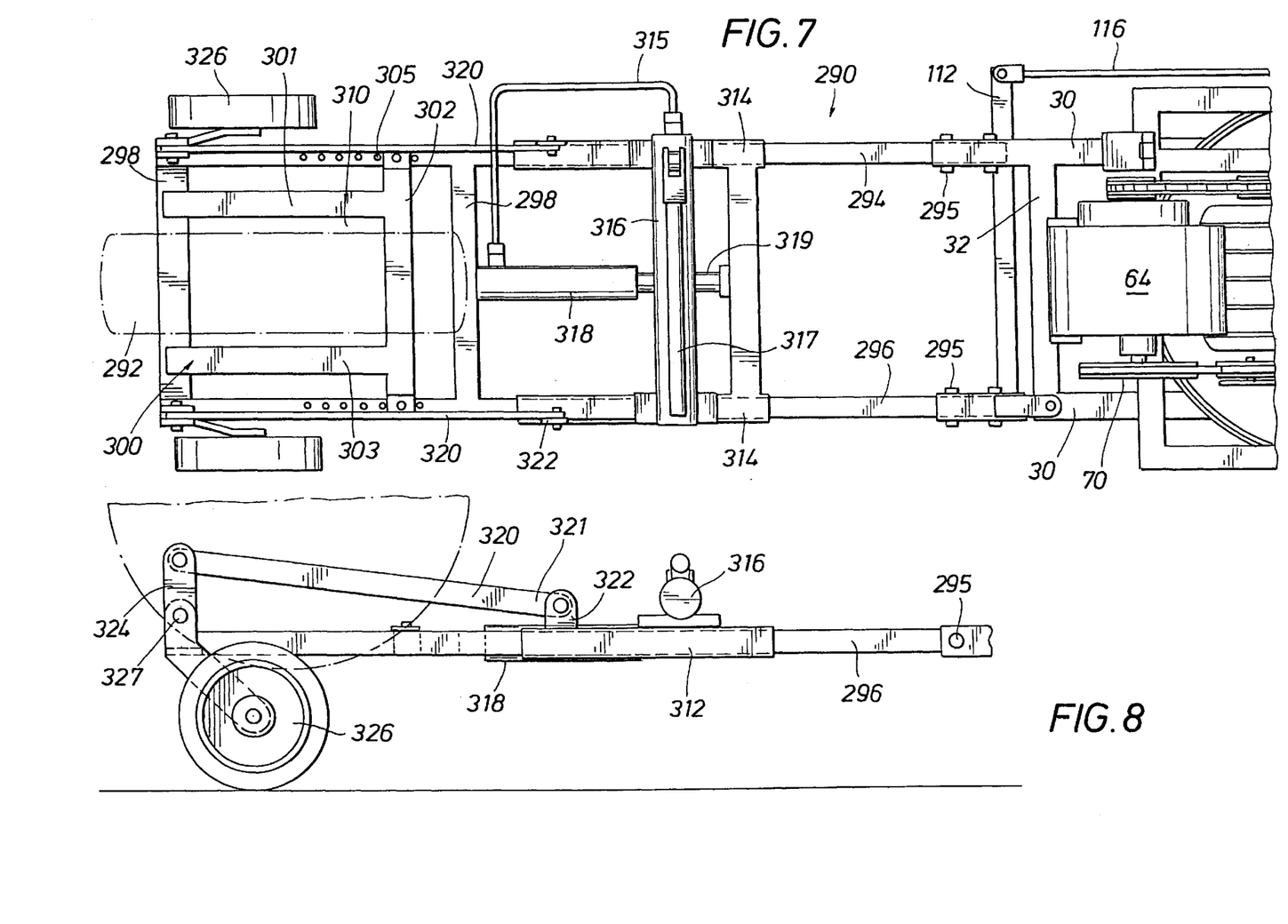
FIG. 7 is a top view of an alternate embodiment of a portion of the present invention.
FIG. 8 is an elevation view of the alternate embodiment shown in FIG. 7.

Referring now to FIGS. 7–10, alternate embodiments of the gripper assembly are shown. Gripper assembly 290 is intended to be used on a workpiece such as the tailwheel of an aircraft. In the case of an aircraft which has a tailwheel (also known as a "tailragger"), there must be sufficient horizontal distance from the tailwheel of the aircraft to the end of its rudder to clear the towing apparatus. Thus, gripper assembly 290 includes longitudinal members 294 and 296. Unlike the preferred embodiment of gripper assembly 90, longitudinal members 294 and 296 do not pivot relative to one another. Rather, they are bolted to longitudinal members 30 of second frame 24 by bolts 295. While lever arm 112 and rod 116 of locking assembly 110 are shown in FIG. 7, they are not used. Longitudinal members 294 and 296 are held fixed relative to one another by cross members 298. A cradle 300 is provided having members 301, 302, 303. Cradle 300 is used to support the tailwheel 292 of the aircraft, or similar workpiece. Members 294 and 296 include apertures 305. Pins are provided at each end of member 302 and are adapted to fit within corresponding apertures 305 enabling the operator to select the size of opening 310 so as to accommodate a particular size tailwheel 292.

Referring still to FIGS. 7 and 8, assembly 290 includes sled 312 having longitudinal members 314 adapted to slide relative to members 294 and 296. Sled 312 supports a hydraulic jack 316 which is in fluid communication by hose 315 to a hydraulic ram 318. Members 320 are provided which connect at one end 321 to a flange 322 of each member 314. The other end of each member 320 is pivotally connected to a rotating arm 324. A wheel 326 is attached to one end of each arm 324. Each arm 324 is pivotally supported by a member 294 or 296 at pin connection 327.

Figure 9:
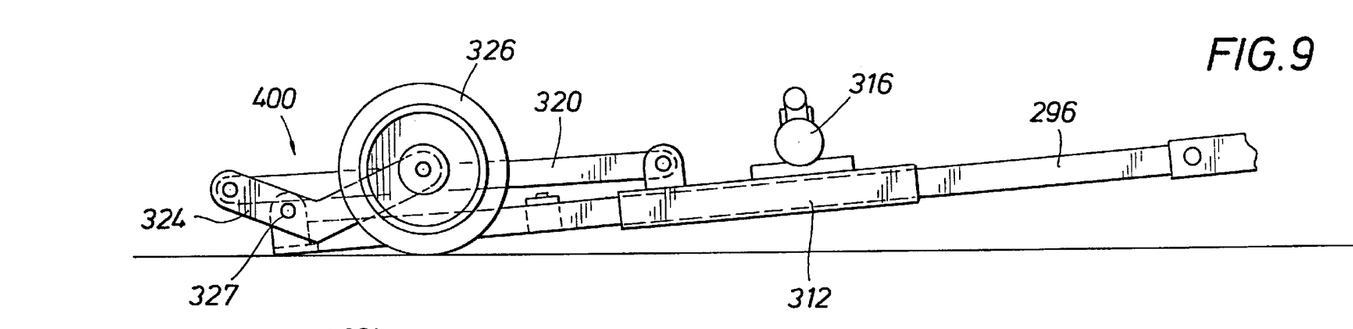
FIG. 9 is a different operational sequence of the alternate embodiment shown in FIG. 8.

In the operation of this alternate embodiment, the operator releases all pressure from hydraulic jack 316 which permits sled 312 to slide to the left as shown in FIG. 7. This results in the pivotal movement of wheel 326 about pin connection 327, thereby lowering end 400 of gripper assembly 290 as seen in FIG. 9. In this lowered position, the operator may advance the present invention under a tailwheel 292 into space 310 defined by cradle 300. The operator then pumps handle 317 of jack 316 introducing hydraulic pressure into ram 318 and advancing piston 319 to the right as shown in FIG. 7. Such movement of piston 319 to the right causes sled 312 also to move to the right. This causes the pivotal movement of wheels 326 in a clockwise direction about connection 327 until an elevated position is achieved as shown in FIG. 8. The present invention may then be used to tow the aircraft as described below in more detail below.

Figure 10:
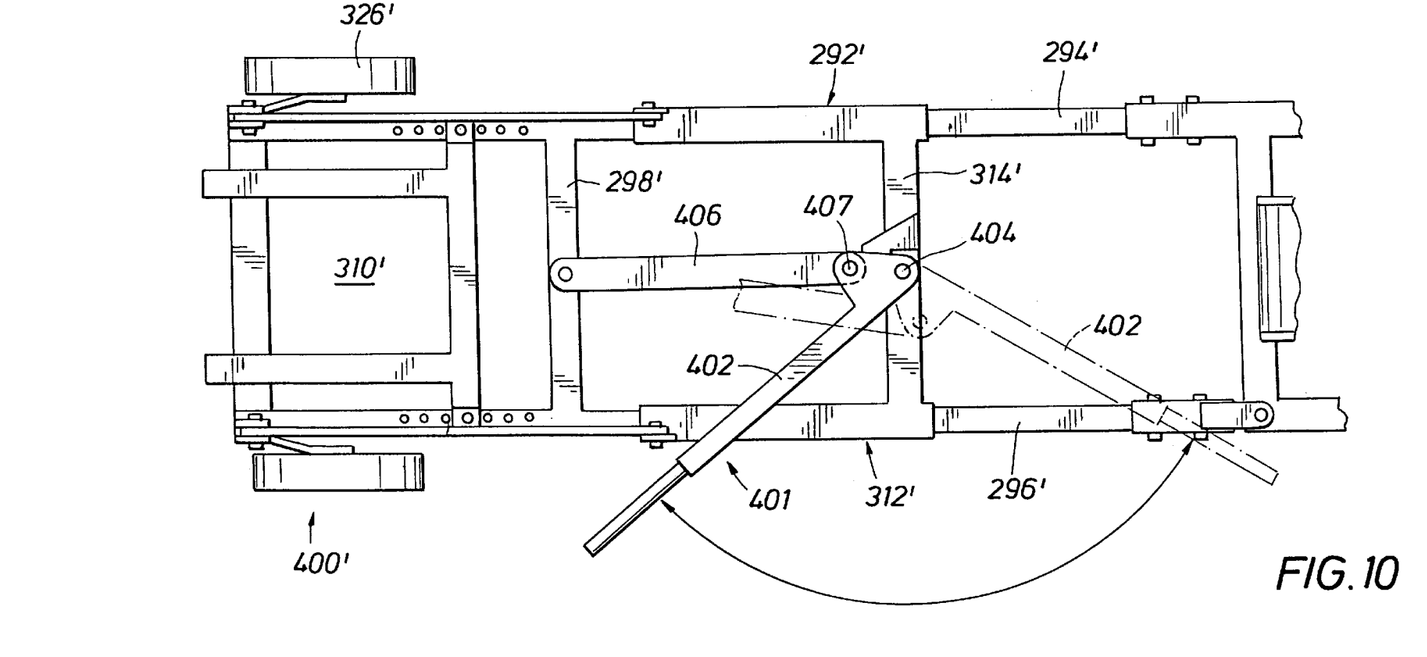
FIG. 10 is a top view of another alternate embodiment of a portion of the present invention.

Referring to FIG. 10, an alternate embodiment of gripper assembly 292 as seen in FIG. 7 is depicted. In this alternate embodiment, gripper assembly 292' includes a mechanical linkage assembly 401 in place of hydraulic jack 316/ hydraulic ram 318 as shown in FIG. 7. Linkage assembly 401 includes a handle 402 pivotally attached to sled 312 at pin connection 404. Handle 402 is connected to member 406 at connection 407. The other end of member 406 is attached to a cross member 298. Thus, rather than pumping a handle 317 to displace a piston 319 and move sled 312 as discussed above with respect to FIGS. 7 and 8, the operator rotates handle 402 about pivot connection 404. If handle 402 is in the position shown by solid lines in FIG. 10, the end 400' of gripper assembly 292' is in the position shown in FIG. 9. Once the operator has positioned the present invention under a tailwheel within cradle opening 310' as discussed above, the operator rotates handle 402 to the position shown by phantom lines in FIG. 10. This causes the advancement of sled 312' to the right as shown in FIG. 10 and elevates wheels 326' to the position shown in FIG. 8. The operator would then be in the position of moving the aircraft in accordance with the present invention as described below.

OPERATION OF THE PRESENT INVENTION

In the operation of the present invention, the operator starts motor 44. The throttle would be placed initially in an idle position and handle 144 would be in a neutral position as seen in FIG. 11. As noted above, the present invention provides that wheel assembly 50 is fixed relative to first frame 22, but can rotate about a first axis 501 defined by axle 54. Similarly, outer drum 80 rotates relative to inner drum 78 about a common substantially vertical axis 502 which, for purposes of FIG. 1, is shown as passing through the center of axle 54 of wheel 52 because wheel assembly 50 is positioned in the center of drums 78/80. However, it is not essential that axis 502 intersect axle 54 for the successful operation of the present invention.

If gripper assembly 90 is used, the operator throttles up motor 44 using throttle 46. If the operator wished to move the present invention in a forward direction, the operator would squeeze the right hand portion of handle 144 thereby advancing lever 142 forward. Since lever 142 is moved in a forward direction, drive shaft 72 rotates in a clockwise direction which therefore rotates sprocket 62 in a clockwise direction and moves the present invention forward. To move the present invention in reverse, the operator squeezes the left-hand portion of handle 144 which moves lever 142 rearward and causes the counterclockwise rotation of drive shaft 72.

Preferably, bracket 84 remains in the locked position as shown in FIG. 1 while the present invention is being maneuvered about in a non-towing mode. However, when it is time to attach gripper assembly 90 to a workpiece, knob 88 is rotated upwardly pivoting bracket 84 about bolt connection 86 thereby permitting relative movement of the first frame 22 relative to the second frame 24.

Referring to FIG. 5, if the preferred embodiment of gripper assembly 90 is used, the operator advances gripper assembly 90 to the position shown in FIG. 5 and engages hub 104 against axle hub 106 of nosewheel 92, for example. At that point, the operator rotates lever 118 into a locked position as shown in FIG. 6 advancing hub 126 of second arm 96 against hub 130 of the nosewheel. In this position, the gripper is fully engaged and gas cylinder 132 provides additional load further securing arm 96 against hub 130. With bracket 84 disengaged, the operator may easily rotate the first frame relative to second frame as shown in FIG. 6. Since wheel 52 has a single point of contact against the ground, it is very easy to rotate the present invention about vertical axis 502. In FIG. 6, first frame 22 has only been rotated about 45° relative to its original position; however, it will be understood by one skilled in the art that first frame 22 may be rotated virtually 360° relative to its original position or with reference to second frame 24. The only obstruction that may limit its rotation is that handle assembly 140 may contact the workpiece. However, except for this limitation, first frame 22 may rotate 360° relative to second frame 24.

Referring back to FIG. 6, once the operator has moved first frame 22 to a particular angle relative to second frame 24, the left portion of handle 144 is pulled upwardly thereby advancing lever 142 to the right as shown in FIG. 2 which is the reverse mode. This means that drive shaft 72 would rotate in a counter clockwise direction which in turn rotates sprocket 62 in a counterclockwise direction and causes the present invention to move in a reverse direction, i.e., it is pulling the aircraft. Moving in a reverse direction enables the operator to advance the workpiece rearwardly and easily maneuver it.

Since the present invention is balanced, it is very easy to operate. As can be seen, the weight of transmission 64 largely balances the weight of the motor 44 about vertical axis 502. In this manner, the present invention is very easy to handle. Additionally, since transmission 64 and motor 44 are close to the ground, the present invention is very stable.

It will be apparent to one skilled in the art that the present invention provides means to simultaneously power and rotate first frame 22 relative to second frame 24 without the need to lift any portion of wheel 52 off the ground. Additionally, the present invention provides a very stable design since it has a low center of gravity. Furthermore, the present invention provides for the towing of a workpiece along an axis 503 (occasionally referred to as a second axis) which is generally co-linear with the point-of-contact of the nosewheel of the workpiece, for example, and the point-of-contact of second frame 24 with drum 80. The present invention provides for the placement of axis 503 proximate axis 501 of wheel 52. By positioning the tow axis 503 proximate axis 501 of wheel 52 enhanced stability is achieved not found in the prior art. For example, in both U.S. Pat. Nos. 3,819,001 and 3,861,483, the prior art devices are unstable due to the significant vertical distance between the towing axis from the rotational axis of the wheel. This creates a large moment which therefore requires a stabilizing system as noted therein.

In the present invention, it has been found preferable to position axis 503 no more than between about 60% of the radius of wheel 52 above to about 60% of the radius of wheel 52 below axis 501. This relationship is shown in FIG. 4 wherein "r" represents the radius of wheel 52 and α represents about 60% of "r". As used herein, the term "wheel" includes the tire. More preferably, α is about 40% of "r", and most preferably, α is about 20% of "r".

Additionally, the present invention provides for a very short turning radius—the distance from the contact point of wheel 52 with the ground and the axle of nosewheel 92. This is also a significant advantage because it permits very sharp turns. In fact, the operator could move first frame 22 90° to 160° off center and then move the aircraft very sharply.

In the use of the alternate gripper assemblies 290 and 290', arms 94 and 96 of gripper assembly 90 are disconnected at bolts 99 as shown in FIG. 5, and arms 294 and 296 are connected to members 30 with bolts 295. If the embodiment shown in FIG. 7 is used, the operator would release pressure within jack 316 allowing sled 312 to slide to the left as shown in FIG. 7 permitting wheels 326 to pivot about connection 327 as seen in FIG. 9. This lowers end 400 of gripper assembly 290. The operator would then advance the present invention by pulling on handle 144 to move the present invention in a forward direction. This would advance end 400 under a tailwheel until it rests within cradle opening 310. At that point, the operator pumps handle 317 moving piston 319 to the right which causes sled 312 to move to the right. Wheels 326 then rotate about connection 327 until in an upright position as shown in FIG. 8. At that point, the operator may move the present invention in a rearward direction as described above and easily maneuver the aircraft about the airfield or within a hanger or other confined space.

If gripper assembly 290' is used as shown in FIG. 10, the operator would simply place handle 402 in the position shown by, solid lines. This lowers gripper assembly 290' to the position shown in FIG. 9. Once the tailwheel is positioned within cradle opening 310', the operator moves handle 402 to the position shown by phantom lines in FIG. 10. This elevates gripper assembly 290' to the position shown in FIG. 8. Once again, the operator is then free to operate the present invention as described above.

The foregoing invention has been described in terms of various embodiments. Modifications and alterations to these embodiments will be apparent to those skilled in the art in view of this disclosure. It is, therefore, intended that all such equivalent modifications and variations fall within the spirit and scope of invention as claimed.

What is claimed is:

1. An apparatus for towing a workpiece comprising:
   a first frame having a first generally circular member with a first radial surface;
   a second frame having a second generally circular member with a second radial surface, said second circular member being rotatably engaged with said first generally circular member such that said first frame is rotatable relative to said second frame about a substantially vertical axis common to said first and second circular members and such that at least a portion of said first radial surface and at least a portion of said second radial surface frictionally engage upon generally forward or generally rearward movement of said first frame to transmit motion to said second frame;
   a wheel assembly interconnected with said first frame, said wheel assembly having a generally horizontal first axis and a wheel rotatable about said first axis to drive movement of said apparatus along a surface;
   a motor to power said wheel assembly; and
   an adjustable gripper assembly interconnected with said second frame, said gripper assembly being adjustable to removably attach the workpiece.

2. The apparatus of claim 1, wherein said gripper assembly includes a tow frame with a rollable support and an adjustable cradle adapted to retain a section of the workpiece generally between said rollable support and said wheel assembly for towing the workpiece along the surface, and wherein said cradle is positioned generally between a generally horizontal axis of said rollable support and said wheel assembly such that a portion of the weight of the workpiece is distributed between the rollable support and the wheel assembly, said tow frame including a tiltable frame lowerable so as to allow passage of a workpiece into said cradle.

3. The towing apparatus of claim 1, wherein said frictionally engageable radial surface portions are positioned at least a vertical distance from said first axis within about 60% of the radius of said wheel.

4. The apparatus of claim 1, wherein said second frame is adapted to rotatably engage with said first frame such that said first frame is generally rotatable up to at least 90° relative to said second frame.

5. An apparatus for towing a workpiece comprising:
   a first frame having a first generally circular member with a first radial surface;
   a second frame having a second generally circular member with a second radial surface, said second circular member being rotatably engaged with said first generally circular member such that said first frame is rotatable relative to said second frame about a substantially vertical axis common to said first and second circular members and such that at least a portion of said first radial surface and at least a portion of said second radial surface frictionally engage upon generally forward or generally rearward movement of said first frame to transmit motion to said second frame;
   a wheel assembly interconnected with said first frame, said wheel assembly having a generally horizontal first axis and a wheel rotatable about said first axis to drive movement of said apparatus along a surface;
   a motor to power said wheel assembly; and
   an adjustable gripper assembly interconnected with said second frame, said gripper assembly being adjustable to removably attach the workpiece and including a tow frame with a rollable support and an adjustable cradle adapted to retain a section of the workpiece generally between said rollable support and said wheel assembly for towing the workpiece along the surface.

6. The apparatus of claim 5, wherein said cradle is positioned generally between a generally horizontal axis of said rollable support and said wheel assembly such that a portion of the weight of the workpiece is distributed between the rollable support and the wheel assembly.

7. A The towing apparatus of claim 5, wherein said frictionally engageable radial surface portions are positioned at least a vertical distance from said first axis within about 60% of the radius of said wheel.

8. The towing apparatus of claim 5, wherein said tow frame includes a tiltable frame lowerable so as to allow passage of a workpiece into said cradle.

9. The towing apparatus of claim 5, further comprising:
   a handle assembly attached to said first frame for rotating said first frame relative to said second frame; and
   a transmission supported by said first frame enabling the transmission of power from said motor to said transmission and then to said wheel assembly permitting the forward or rearward motion of said towing apparatus.

10. An apparatus for towing a workpiece comprising:
    a first frame having a first generally circular member with a first radial surface;
    a second frame having a second generally circular member with a second radial surface, said second circular member being rotatably engaged with said first generally circular member such that said first frame is rotatable relative to said second frame about a substantially vertical axis common to said first and second circular members and such that at least a portion of said first radial surface and at least a portion of said second radial surface frictionally engage upon generally forward or generally rearward movement of said first frame to transmit generally forward or generally rearward movement to said second frame;

a wheel assembly interconnected with said first frame, said wheel assembly having a generally horizontal first axis and at least one wheel rotatable about said first axis to drive movement of said first and second frames along a surface, wherein said frictionally engageable radial surface portions are positioned a vertical distance from said first axis within about 60% of the radius of said wheel;

a motor to power said wheel assembly; and an adjustable gripper assembly interconnected with said second frame, said gripper assembly being adjustable to removably attach a workpiece, such that said apparatus is operable to tow the workpiece along the surface upon generally forward or generally rearward movement of said first frame.

11. The towing apparatus of claim 10, wherein said first and second circular members are generally cylindrical members disposed in concentric alignment, and said first radial surface is an inside radial surface of said first circular member and wherein said second radial surface is an outer radial surface of said second circular member.

12. The towing apparatus of claim 10, wherein said first generally circular member is rotatable up to at least 90° relative to said second generally circular member.

13. The towing apparatus of claim 10, wherein said first and second generally circular members are cylindrical members concentrically disposed about said wheel assembly such that said first axis intersects said frictionally engageable radial surface portions of said first and second generally circular members.

14. The towing apparatus of claim 10, wherein said gripper assembly is adapted to adjustably engage the workpiece for towing along a towing plane passing between a workpiece attachment location and said frictionally engageable radial surface portions.

15. The towing apparatus of claim 10, wherein said vertical distance is within about 30% of the radius of said wheel.

16. The towing apparatus of claim 10, wherein said gripper assembly is adapted to engage the nosewheel of an aircraft.

17. The towing apparatus of claim 10, wherein said gripper assembly is adapted to engage the tailwheel of an aircraft.

18. The towing apparatus of claim 10, wherein said gripper assembly is adapted to secure a section of the workpiece such that a portion of the weight of the workpiece is supported on said towing apparatus.

19. The towing apparatus of claim 18, wherein said gripper assembly includes a tow frame having a rollable support and a cradle adapted to retain the workpiece during towing.

20. The towing apparatus of claim 19, wherein said cradle is positioned generally between said rollable support and said wheel assembly.

21. The towing apparatus of claim 20, wherein said cradle is positioned such that said gripper assembly is adapted to distribute the portion of the weight of the workpiece between said rollable support and said wheel assembly.

22. The towing apparatus of claim 10, further comprising:

a handle assembly attached to said first frame for rotating said first frame relative to said second frame; and a transmission supported by said first frame enabling the transmission of power from said motor to said transmission and then to said wheel assembly permitting the forward or rearward motion of said towing apparatus.

\* \* \* \* \*